United States Patent [19]

Vaughen

[11] Patent Number: 4,951,770
[45] Date of Patent: Aug. 28, 1990

[54] STRUCTURE TO FORM A LOAD-BEARING AIR CUSHION FOR A VEHICLE

[76] Inventor: Jack F. Vaughen, 26807 Spring Creek Rd., Rancho Palos Verdes, Calif. 90274

[21] Appl. No.: 381,153

[22] Filed: Jul. 14, 1989

[51] Int. Cl.$^5$ .............................................. B60V 1/04
[52] U.S. Cl. .................................... 180/124; 180/127
[58] Field of Search ................ 180/124, 125, 127, 128

[56] References Cited

U.S. PATENT DOCUMENTS

| | | | |
|---|---|---|---|
| 3,768,588 | 10/1973 | Vaughen | 180/127 |
| 3,908,785 | 9/1975 | Vaughen | 180/127 |
| 4,077,489 | 3/1978 | Vaughen | 180/124 |
| 4,538,699 | 9/1985 | Kutscher et al. | 180/125 |

Primary Examiner—Kenneth R. Rice

[57] ABSTRACT

In an air cushion load transport vehicle, an annular sealing assembly comprising an annular inflatable hanger on the underside of a load-bearing base and an annular sealing means on the underside of the hanger confines a load-supporting air cushion that is continuously supplied with compressed air during operation. Stability is promoted by a number of design features in the inflatable hanger, the annular sealing means, the flexible connection between them and the load support structure. These include means for automatically closing off flow through hanger damping eyelets during initial hanger pressurization together with means to keep the eyelets open at all operating hanger heights. Additional covered ports are provided in the outer hanger wall positioned to automatically vent if the hanger is over-inflated thereby avoiding dynamic instability. A check valve is incorporated into the device to prevent damage from inadvertantly inflating the hanger before the cushion is pressurized. Finally, critical relationships between key design parameters and seal materials are defined which avoid dynamic instability of the air cushion load-bearing vehicle during operation.

42 Claims, 5 Drawing Sheets

STRUCTURE TO FORM A LOAD-BEARING AIR CUSHION FOR A VEHICLE

CROSS REFERENCE TO PREVIOUSLY ISSUED PATENT

This application describes and claims a number of improvements over my previously issued patent Ser. No. 3,768,588 titled "Structure to Form a Load-bearing Air Cushion For a Vehicle" which issued on Oct. 31, 1973.

BACKGROUND OF THE INVENTION

The cross-referenced issued patent discloses various embodiments of a load-bearing air cushion device in which an annular sealing assembly for confining an air cushion comprises an annular hanger which inflates downwardly from a load-bearing base together with a flexible resiliently yieldable annular sealing means which projects downward from the annular hanger into close proximity to the ground or support surface along which the vehicle travels.

In the application of this technology to the design of practical air cushion vehicles, it was found that certain combinations of design parameters are critical and must fall within well defined ranges to avoid dynamic instability of the loaded vehicle. Also it was found that operational advantages accrue from separately inflating the seal hanger and the lifting cushion. However, the ratio of pressures in these two components must fall within defined limits. If the inflation pressure in the seal hanger is too low compared to pressure in the lifting cushion, the hanger will tend to collapse allowing the loaded vehicle to settle to the floor. On the other hand, if the hanger inflation pressure is too high the vehicle will experience dynamic instability which increases in severity as this pressure is increased.

It is a primary objective of this invention to define and claim the useful working ranges of critical design parameters required to avoid dynamic instability of this type air cushion vehicle. Structure is also described and claimed which prevents inadvertant over-pressurization of the seal hanger at all loads carried by the air cushion vehicle.

Another objective of this invention is to provide a sealing assembly comprising an annular inflatable hanger with an annular sealing means dependent therefrom in which the annular sealing means is made of relatively soft resiliently deformable material of substantial vertical dimension and yet does not expand outward radially under pressure inside the confined air cushion even when this pressure is substantially greater than pressures attained with previous designs.

SUMMARY OF THE INVENTION

This invention relates to improvements in air or fluid cushion load bearing and transport devices in which each lifting cushion is contained under the load by an encompassing seal assembly comprising an upper inflatable element in combination with a lower flexible non-inflatable element. The upper inflatable element comprises a seal "hanger" made from concentric opposite-facing truncated cones of fluid-tight flexible material. The innermost and outermost peripheral edges of these truncated cones are mounted in fluid-tight manner to underside structure of the load bearing device. The intermediate adjacent peripheral edges of the two truncated cones are attached in fluid-tight manner to a cloth ring which in turn is attached, preferably by bonding, to a rigid flat structural ring. The lower flexible non-inflatable seal assembly comprises a lowermost flat flexible wear ring with its inner and outer edges preferably chamfered. This wear ring can be made of a variety of alternate materials to provide an efficient fluid seal when operated over various floor surfaces. However, for most common operating surfaces such as smooth concrete for example, the preferred construction of this wear ring is elastomeric material faced with low-friction plastic. The remainder of the lower seal element is comprised of flat tension rings with sponge elastomer spacer rings interposed between them. The uppermost sponge rings are preferably of lesser density and stiffness than the lowermost rings. The lowermost flat tension ring is attached in fluid-tight manner to the aforementioned seal ring. The uppermost flat tension ring is attached in fluid-tight manner to the outer region of a flat ring of fluid-tight flexible material. The inner region of this flat ring is then attached in fluid-tight manner to the underside of the aforementioned rigid flat structural ring. The region of the flat flexible ring which lies between these two concentric areas of attachment is preferably formed of "slack" material to allow the lower element of the seal assembly to flex both vertically and angularly relative to the flat structural ring.

In an air cushion device constructed as described above, operating experience has demonstrated that certain relationships between design parameters of the seal assembly are critical for avoidance of dynamic instability during operation. For example, the ratio of innermost and outermost radii of the inflatable seal hanger must fall within a well-defined range for stability. Similarly, there is a critical range in the ratio of height of the truncated cones which comprise the inflatable hanger compared to the overall radial width of the hanger. In the lower non-inflatable seal assembly there is a critical ratio between the radial width and vertical height of the sponge elastomer spacer rings. There is also a critical ratio between the density (and therefore stiffness) of the upper elastomer spacer rings compared to the lower rings. During operation, there is also a critical ratio between the seal inflation pressure and lifting cushion pressure. To prevent over-pressurizing the seal hanger and exceeding this ratio, an automatically opening port is provided in the outer flexible wall of the seal hanger. Damping ports which are also located in the outer hanger wall have auxiliary devices in this invention to automatically close them off during initial inflation of the seal hanger and to insure that they do not close at other times when their damping effect is required.

The seal hanger is inflated separately from the lifting cushion in this invention. During operation it is necessary that pressure inside the lifting cushion exceed pressure inside the seal hanger. This requires that the lifting cushion be inflated during start up prior to inflating the seal hanger. However, since seal inflation is under control of the operator, it is possible to inadvertantly inflate the seal before pressurizing the lifting cushion. If this is done, the seal hanger attachment could separate from the base structure around its innermost periphery. To prevent this, the invention includes a check valve mounted on the outer wall of the center support structure. This valve allows air or fluid to pass freely from the seal hanger into the lifting cushion if seal pressure exceeds cushion pressure but prevents flow from the lifting cushion into the hanger if cushion pressure exceeds hanger pressure.

BRIEF DESCRIPTION OF THE DRAWINGS

In the drawings which are to be regarded as merely illustrative.

DESCRIPTION OF THE INVENTION

This invention relates to improvements in air cushion lifting and transport vehicles. Such vehicles are typically supported by one or more devices known variously as "air casters" or "air bearings". These can actually be energized by any working fluid including either liquids or gases. However, for convenience throughout this description, the invention will be referred to as an "air caster".

Figure 1:
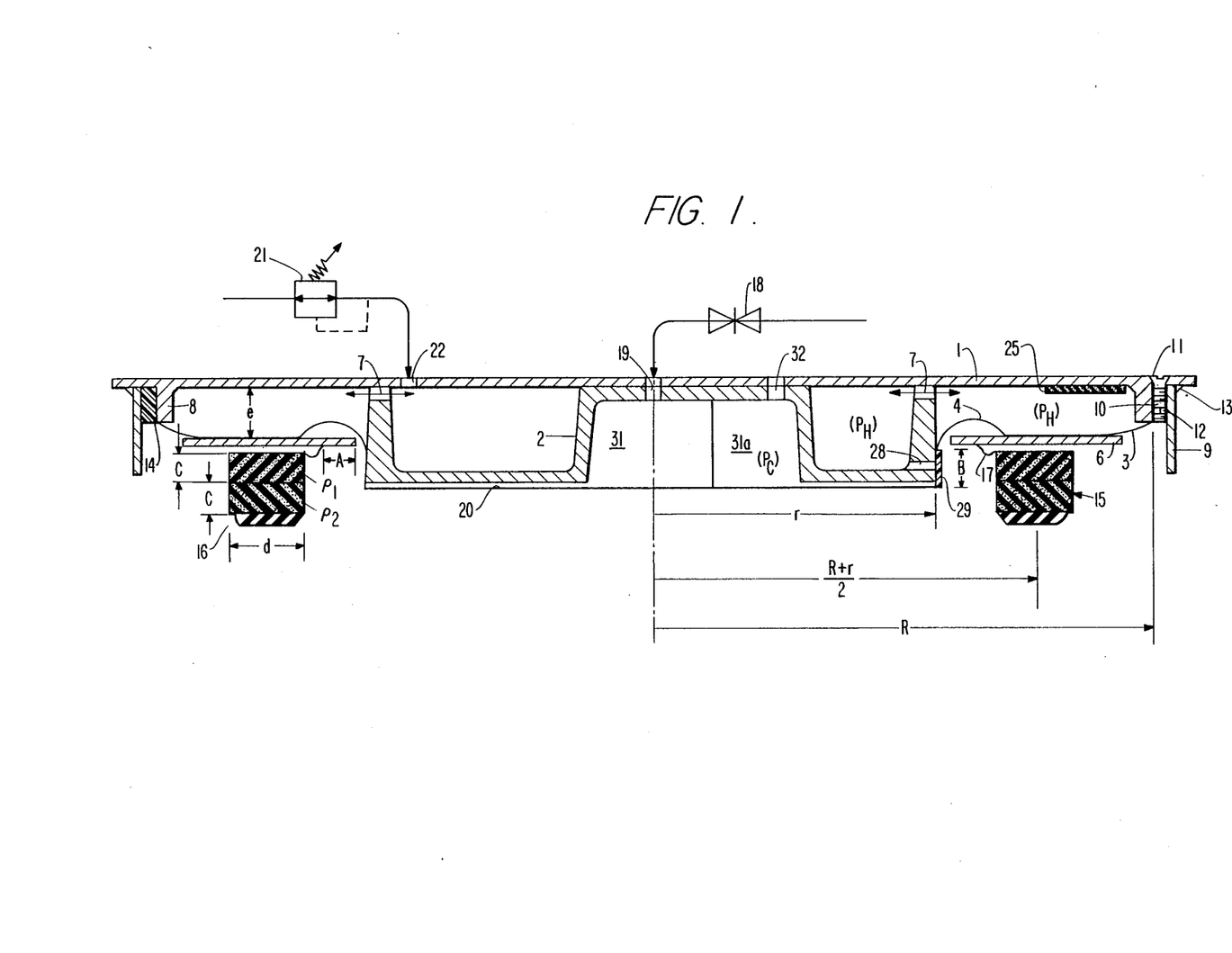
FIG. 1 is a diametric cross-sectional view of a single air caster with critical dimensions shown.
Figure 2:
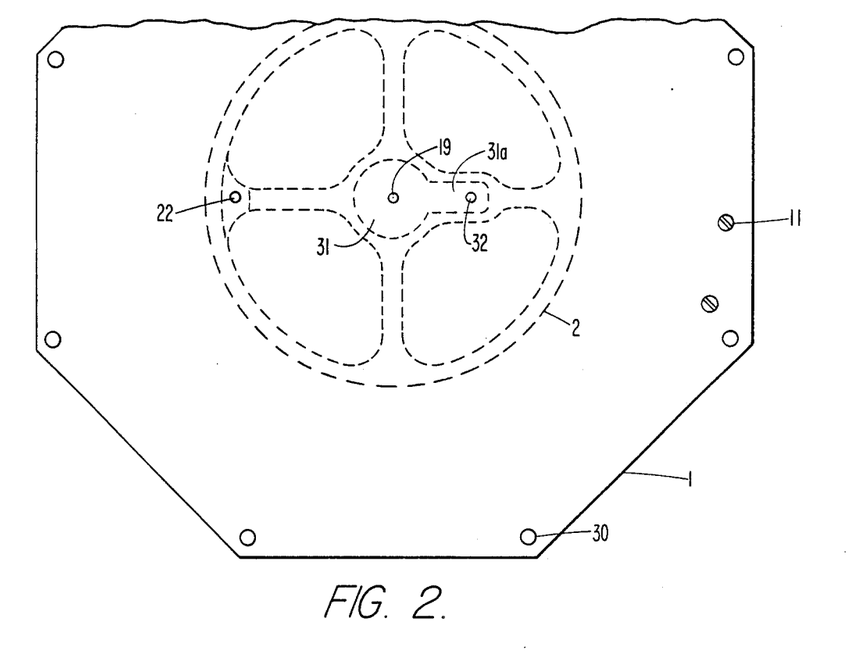
FIG. 2 is a partial plan view of the air caster of FIG. 1 with internal details of the cylindrical structural base shown by dashed outlines.

As shown in FIGS. 1 and 2 a single air caster has a planar structural base plate 1 with a closed hollow cylindrical support structure 2 centered on its underside. This support structure is lifted clear of the floor when the air caster is energized but it is capable of supporting the dead weight of the load whenever the air caster is de-energized and is at rest. The air caster also has a sealing assembly to confine a fluid cushion under the vehicle. This sealing assembly includes an annular hanger projecting from the base means and annular structure below the hanger and cooperative therewith to enclose the lifting air cushion.

The seal hanger is made of flexible sheet material and is inflatable to urge the annular seal structure away from the base of the air caster. The hanger when inflated has an outer annular flexible sheet wall 3 extending from the underside of the planar base plate radially inward to the annular seal structure to oppose lateral displacement of the seal structure in one respect relative to the base. The hanger also has an inner annular flexible sheet wall 4 extending from the cylindrical part of the base radially outward to the seal structure to oppose lateral displacement of the seal structure in the opposite respect relative to the base.

The outer attachment of the inflatable seal hanger to the planar base structure is at radius "R" as shown in FIG. 1. The inner attachment of the inflatable seal hanger to the cylindrical part of the base is at radius "r". To prevent dynamic oscillation or bounce of the loaded air caster, tests have shown that the ratio of these two radii must be $$\frac{r}{R} \leq 0.6$$

Figure 4:
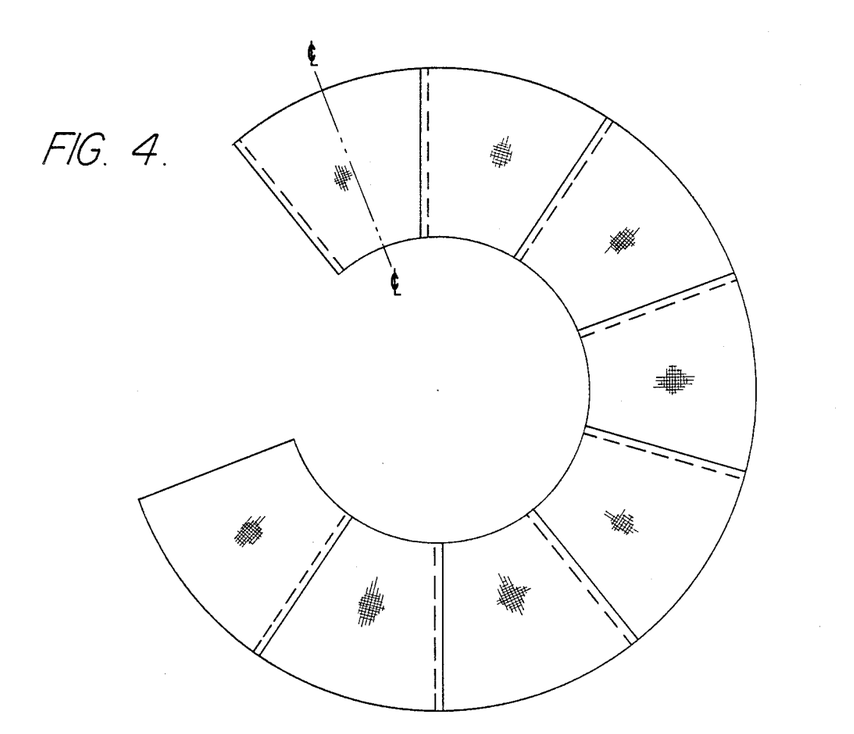
FIG. 4 is a flat pattern for a conical seal hanger wall showing its construction from truncated angular segments.
Figure 5:
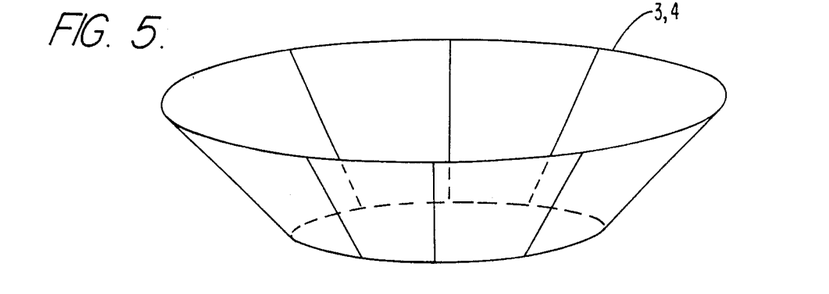
FIG. 5 is a perspective view of the hanger wall in FIG. 4 showing the truncated conical form it takes after edges of all segments are attached together.
Figure 6:
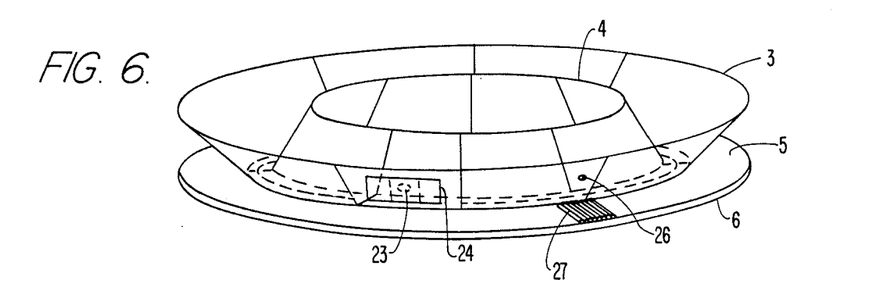
FIG. 6 is a perspective view of a hanger assembly with two types of automatic valves mounted in the outer flexible wall of the hanger.
Figure 7:
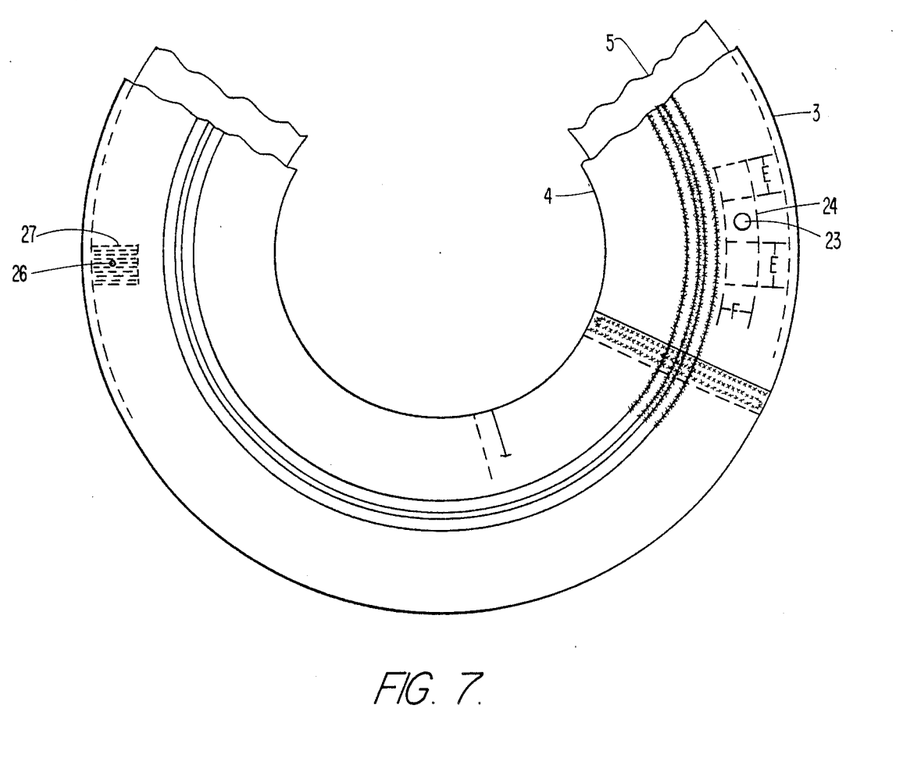
FIG. 7 is a partial plan view of the hanger assembly in FIG. 6 showing a preferred method of assembly for the parts.
Figure 8:
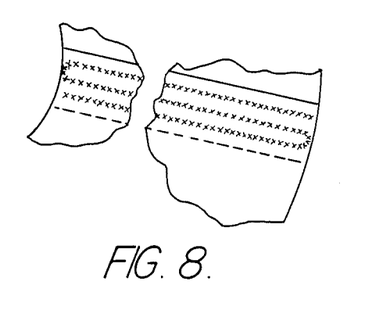
FIG. 8 is an enlarged fragmentary view of one of the radial overlapped joints of FIG. 7.

Construction of the inflatable seal hanger is shown in FIGS. 4, 5, 6 and 7. FIG. 4 is a flat pattern for one seal hanger cone showing how it is assembled from truncated angular segments of coated woven fabric overlapped at their radial edges and attached together in an airtight manner. To provide uniform radial strength of the hanger around its entire periphery, the threads of each angular segment are oriented parallel to the radial center line of the segment as shown. FIG. 5 is a perspective view of the hanger of FIG. 4 showing the truncated conical form it takes after edges of all segments are attached together. FIG. 6 is a perspective view of a complete hanger assembly. This assembly consists of outer cone 3 and inner cone 4 positioned concentric to each other and attached around their intermediate adjacent edges to the concentrically central region of a flat cloth ring 5. Ring 5 in turn is attached, preferably by bonding, to the top surface of rigid ring-shaped plate 6 to complete the assembly. FIG. 7 is a plan view of the inflatable hanger assembly showing the segments of the hanger attached to each other and to flat cloth ring 5 by stitching and bonding. FIG. 8 shows an enlarged detail view of the stitching. If stitching is used in this manner, the stitches must be sealed to prevent leakage of air through the needle holes. However, stitching and sealing can be avoided if the hanger parts are vulcanized together.

Figure 9:
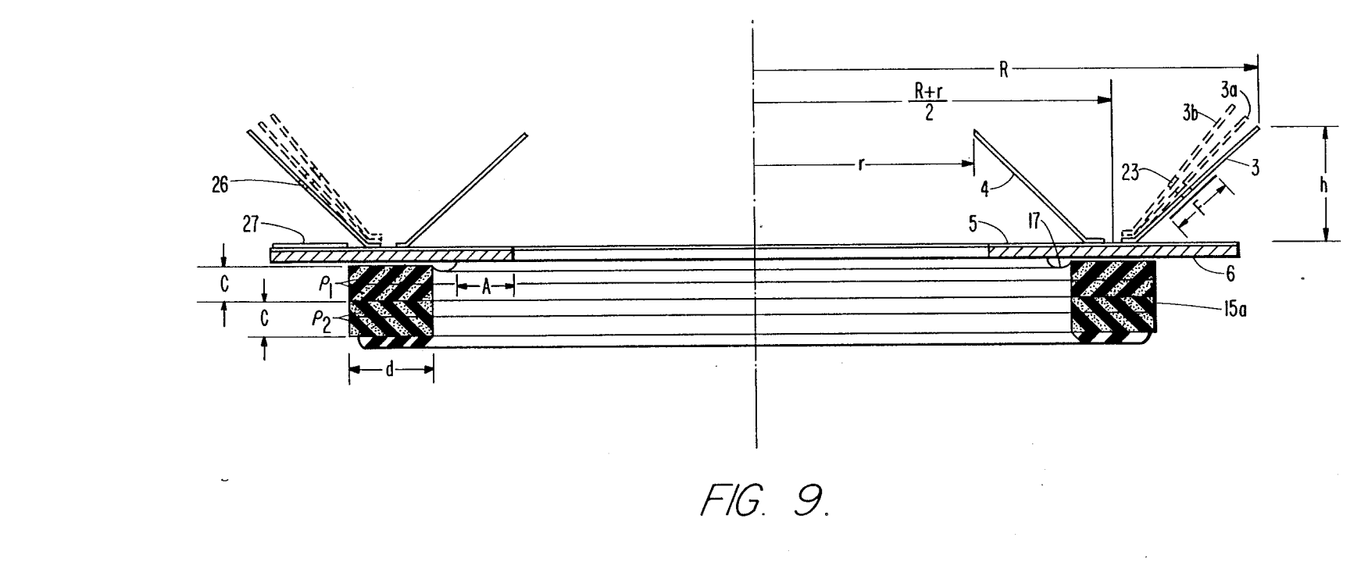
FIG. 9 is a cross-sectional view of a hanger and seal assembly showing critical dimensions and means for increasing strength of the parts to contain elevated pressures inside the hanger and the air cushion.

FIG. 9 is a diametric cross-sectional view of the hanger and plate assembly of FIG. 6 with a reinforced seal assembly mounted to the underside of rigid ring-shaped plate 6. As shown, outer hanger cone 3 and inner hanger cone 4 have vertical height "h", the outer radius of the outer cone is "R" and the inner radius of the inner cone is "r". Test experience with this type air caster has demonstrated that to prevent dynamic oscillation or bounce of the loaded air caster, the ratio of cone height to overall hanger width must be $$\frac{h}{(R-r)} \leq 0.6$$

As a further consequence of the hanger cone geometry specified above it is also true that height of inner cone 4 must be related to its innermost radius "r" by the ratio $$\frac{h}{r} \leq 0.4$$

Similarly, height of outer cone 3 must be related to its outermost radius "R" by the ratio $$\frac{h}{R} \leq 0.2$$

When the seal hanger is inflated, pressure-induced stresses are greater in the outer cone 3 than they are in inner cone 4. This is the natural result of the annular geometry of the seal hanger. Therefore, to increase load capacity of a given size air caster, it is desirable to make the strength of the outer cone greater than the strength of the inner cone. This can be done by using heavier material in the outer cone than in the inner cone. However, due to strength limitations of commercially available materials, it may be preferably to use additional layers of material in the outer cone. This can be done by nesting identical outer truncated cones 3, 3a and 3b together as indicated by the dashed lines in FIG. 9. These dashed lines show that two additional outer cones have been added to give the outer hanger wall the strength of three layers. Although these multiple layers could be bonded or vulcanized to each other over their surface area, this is not recommended because the stiffening of the hanger which results can cause dynamic instability of the operating air caster. It is preferable to attach the multiple cone layers to each other only along their innermost and outermost circumferential edges. When multiple outer hanger cones are nested together it is also desirable to circumferentially stagger them relative to each other so their radial overlapped joints are equally spaced around the hanger like the spokes of a wheel to promote uniform radial strength of the hanger around its entire periphery.

With the hanger geometry specified above it follows that the circumferential edge of smallest diameter of the inner hanger cone is the inner circumferential edge of the hanger and the circumferential edge of largest diameter of the outer hanger cone is the outer circumferential edge of the hanger. As shown in FIG. 1, the inner circumferential edge of the hanger is attached to the vertical wall of the hollow cylindrical portion of the structural base 2. To avoid dynamic instability of the loaded air caster, tests have shown that it is advantageous to maximize enclosed volume of the seal hanger and minimize enclosed volume of the lifting air cushion. To contribute to this objective, the cylindrical portion of the base 2 projects downward into the lifting cushion cavity, thereby displacing volume from the lifting cushion. Furthermore, this cylindrical structure is hollow as shown and its inner volume is in communication with the interior of the seal hanger through passages 7. Therefore, the volume of cylindrical structure 2 is effectively added to volume of the seal hanger and subtracted from volume of the lifting cushion. Volume enclosed by the seal hanger is further increased by attaching the innermost marginal edge of the hanger to the cylindrical wall of the base as close to the bottom edge of the wall as possible. This is shown in FIG. 1 where the inner hanger is attached to the cylindrical base around its entire periphery over a vertical height "B".

As shown in FIG. 1, an integral circumferential structural ridge 8 projects downward from the underside of planar base structure 1. This ridge is preferably circular in plan view. The outer edge of outer hanger wall 3 is attached in airtight manner, preferably by bonding, to the outer vertical surface of ridge 8. Ridge 8 is concentrically encompassed by structural guard ring 9 which is circular in plan view and is of larger diameter than ridge 8. Guard ring 9 is preferably of slightly less vertical height than cylindrical base structure 2. Therefore, when the air caster is at rest the load is supported by cylindrical structure 2 with the lower edge of guard ring 9 not quite touching the floor. Guard ring 9 is fitted with a number of inward-facing horizontal tabs equally spaced around its inner periphery. Each of these tabs has a hole drilled through it to fit over an attaching screw 11. Each of these screws projects through planar base structure 1 and is flush mounted thereto so the screw head does not protrude above the top surface of base 1. A nut 12 on each attaching screw 11 bears against the underside of each tab 10 to secure guard ring 9 against the underside of base 1. Typically from eight to twelve attaching screws are used to attach the outer guard ring to the base of the air caster. However, additional flush head screws are installed in the annular space between ridge 8 and guard ring 9. These are typically spaced approximately 1¼ inches apart and are equally spaced circumferentially between tabs 10. No nuts are required on these intermediate screws. A fillet of suitable sealing material 13 is applied around the outer periphery of guard ring 9 where its upper edge bears against the underside of base 1. The air caster is placed inverted on a level surface with its seal assembly facing upward and the annular cavity between ridge 8 and guard ring 9 is filled with rigid-setting plastic. This plastic material 14 unites the seal hanger, the structural base and the guard ring into one integral structural assembly after the plastic flows around the attaching screws and hardens.

The air caster shown in FIG. 1 has a structural base to receive loads and a seal assembly to confine a fluid cushion under the load. This seal assembly includes an annular inflatable hanger projecting from the base, a rigid ring-shaped plate mounted to the inflatable hanger and resiliently deformable annular sealing means mounted to the underside of the ring-shaped plate and projecting downward therefrom to close proximity to the floor over which the air caster operates. Tests have established that with the geometry specified, to avoid dynamic instability of the loaded air caster, annular sealing means 15 must be centered concentrically relative to the inflatable hanger. Therefore, if the inner radius of the inflatable hanger is "r" and its outer radius is "R" the mean radius of annular sealing means 15 must equal $$\frac{(R + r)}{2}$$

as shown in FIG. 1.

Annular sealing means 15 consists of a lowermost wear ring 16 backed up by a lamination of flexible flat tension rings separated by elastomeric sponge spacer rings. The flat tension rings and the elastomeric spacer rings have identical radial width "d" as shown in FIG. 1. Using the elastomeric materials specified, this radial width combined with vertical height "c" of the individual elastomeric rings determines vertical stiffness or spring rate of the annular sealing assembly 15. This spring rate in turn affects the dynamic characteristics of the loaded air caster. Tests have shown that for the geometry and materials specified, radial width "d" of the annular sealing means must be substantially less than radial width of the inflatable seal hanger (R-r) and must be related thereto by the following ratio $$0.25 < \frac{d}{(R - r)} < 0.35$$

In the configuration shown in FIG. 1, the annular sealing means has three flat flexible tension rings separated by two relatively thick elastomeric sponge rings.

The purpose of these flat tension rings is to prevent radial expansion of the seal assembly as a result of fluid pressure inside the lifting cushion. A similar annular seal assembly is shown in FIG. 9 except that it is designed to withstand greater fluid pressure inside the lifting cushion. In that configuration the seal assembly is strengthened by using five tension rings instead of three.

As shown in FIG. 1 the ring-shaped elastomeric members of seal ring assembly 15 are relatively thick having vertical height or thickness "c". To provide the proper spring rate of the seal ring assembly, vertical height "c" of each ring-shaped resiliently deformable member and radial width "d" of each said member must have the ratio $$0.40 < \frac{c}{d} < 0.50$$

Lowermost wear strip 16 of the annular seal assembly is made of resilient abrasion-resistant material. The outer edge of this wear strip is set back radially from the outer edge of the remainder of the seal ring assembly to minimize noise created by air escaping under the wear strip. Both outer and inner edges of this wear strip are chamfered as shown to facilitate passage over small imperfections in the floor surface. The material used for this wear strip can be matched to the characteristics of the floor or ground surface over which the air caster operates. For operation over smooth impervious surfaces, the wear strip may be made of elastomeric material coated on its underside surface with a low friction wear resistant plastic. By contrast, for operation over rough or porous surfaces the wear strip may be made of felt-like material. The wear strip may be permanently attached to the lowermost flat tension ring of the seal ring assembly, or alternatively, it may be attached by releasable pressure-sensitive adhesive means for easy replacement whenever it becomes worn or damaged.

As shown in FIG. 1, annular seal assembly 16 consists of an upper resiliently deformable ring having density $\rho_1$ and a lower resiliently deformable ring having density $\rho_2$, these rings being separated by a flat flexible tension ring. The upper ring is substantially softer than the lower ring to cause the seal to accomodate to any local rise in the floor surface primarily by compression of the upper ring. In the preferred embodiment of the invention, the upper resilient ring having density $\rho_1$ is molded of MIL-C-3133 SC011 soft open cell natural sponge rubber. The lower resilient ring having density $\rho_2$ is molded of MIL-R-6130 type II soft closed cell neoprene sponge. These elastomer sponge rings are typically molded in heated aluminum molds which produce an airtight flexible skin over their entire outer surfaces. This skin prevents radial air loss through the sponge material. Tests have shown that optimum dynamic characteristics will be attained if density of the upper ring $\rho_1$ and density of the lower ring $\rho_2$ have the ratio $$\frac{\rho_1}{\rho_2} \approx \frac{2}{3}$$

FIG. 9 shows a modified form of the annular seal 15a which is designed to withstand increased pressure inside the fluid cushion. This seal assembly employs five flat tension rings instead of three and four elastomeric spacer rings instead of two. To maintain the overall height of the seal assembly unchanged, each of the elastomeric rings in FIG. 9 is half the height of each elastomeric ring in FIG. 1. To maintain dynamic characteristics unchanged, the two upper elastomeric rings in FIG. 9 both have density $\rho_1$ and their combined vertical height is "c" which is identical to vertical height of the single upper elastomeric ring in FIG. 1. Similarly, the two lower elastomeric rings in FIG. 9 both have density $\rho_2$ and their combined vertical height is "c" which is identical to vertical height of the single lower elastomeric ring in FIG. 1. For the seal configuration shown in FIG. 9, overall height "c" of each pair of rings having the same density and radial width "d" of the seal assembly must have the ratio $$0.4 < \frac{c}{d} < 0.5$$

The air caster shown in FIG. 1 has a structural base to receive loads and a seal assembly to confine a fluid cushion under the load. This seal assembly includes an annular inflatable hanger 3, 4 projecting from the base, a rigid ring-shaped plate 6 mounted to the inflatable hanger and resiliently deformable annular sealing means 15 mounted to the underside of the ring-shaped plate and projecting downward therefrom to close proximity to the ground surface over which the air caster operates. The resiliently deformable annular sealing means is flexibly mounted to the underside of the ring-shaped plate by a ring-shaped flexible fluid-tight sheet 17 which is attached in fluid-tight manner over radial width "d" to the top surface of annular sealing means 15 around its outer circumferential margin and is attached in fluid-tight manner to rigid ring-shaped plate 6 over radial width "A" around its inner circumferential margin. The intermediate circumferential portion of the ring-shaped sheet is slack to permit the annular sealing means to tilt locally relative to the rigid ring-shaped plate.

Operating experience with the type air caster described has demonstrated that vertical spacing of rigid ring-shaped plate 6 below planar base structure 1 during operation is dependent on the ratio of hanger pressure "$P_H$" to cushion pressure "$P_C$". This vertical spacing is designated "e" in FIG. 1. Pressurized air or fluid is supplied to the lifting cushion through a gate valve 18 which is typically controlled by the operator of the air caster. This flotation air or fluid is supplied to the lifting cushion through orifice 19 as shown. This air or fluid is trapped inside the lifting cushion by surrounding seal assembly 15 where it develops cushion pressure "$P_C$". Note that the underside of cylindrical base structure 2 is preferably supplied with radial grooves 20 to facilitate rapid dispersal of flotation air or fluid throughout the cushion cavity even when base 2 is at rest on a flat floor. These radial grooves are shown in profile cross-section in FIG. 1 and in plan view in the underside view of FIG. 3. When flotation air or fluid is supplied to the air caster, cushion pressure will continue to build up until the mathematical product of cushion pressure times cushion area equals the magnitude of the load. Flotation air or fluid will then begin to flow radially outward between the lower face of seal ring 16 and the floor. This thin film eliminates friction between the seal and the floor allowing the loaded air caster to be moved easily in any direction.

The seal hanger is pressurized by opening pressure regulating valve 21. This valve, which is shown schematically in FIG. 1, is normally under the control of the operator and supplies air or fluid to the seal hanger through orifice 22. Note that orifice 22 is shown entering the hollow central portion of base 2 but, as indicated by arrows 7, this space is in communication with the seal hanger. Therefore, both the interior of central structure 2 and the hanger operate at the same pressure "$P_H$". Pressure regulating valve 21 is preferably a precision type valve to provide accurate control over hanger inflation height "e" by adjusting hanger pressure "$P_H$". Also, opposite-pointing arrows in the symbol for valve 21 indicate that it is preferably a "relieving" type valve. Such a relieving pressure regulating valve allows backflow through the valve whenever pressure downstream of the valve exceeds the desired valve output pressure. Since the seal hanger and lifting cushion are inflated separately in this air caster, it is possible for the operator to inadvertantly over-inflate the seal hanger. If this occurs, the loaded air caste will begin a vertical bouncing motion which becomes progressively more severe as seal hanger pressure is increased. It is therefore desirable to provide means in the air caster for automatically preventing over-inflation of the seal hanger thereby avoiding the dynamic instability which would result.

Operating experience has demonstrated that the optimum hanger inflation height "e" is virtually independent of load carried by the air caster. Therefore, avoidance of dynamic instability entails control of hanger inflation height "e" so it cannot exceed a specified maximum level. As shown in FIG. 6, this can be accomplished by placing at least one port 23 in outer flexible sheet wall 3 of the seal hanger. To prevent air from rushing out of this port during initial inflation of the hanger, the port is preferably covered by a flexible sheet of fluid-tight elastomeric material 24. This sheet is rectangular and is attached to the outer surface of hanger sheet wall 3 only near its outer ends leaving its central portion which covers port 23 unattached. Attachment of sheet 24 to hanger wall 3 is therefore confined to the areas of sheet 24 outboard of the dotted lines in FIG. 6. This construction is shown in detail in FIG. 7 where sheet 24 of radial width "F" is attached to the outer surface of hanger wall 3 only over circumferential length "E" near each of its ends. As shown in FIGS. 7 and 9, port 23 in outer hanger wall 3 is positioned radially so that it will normally be pressed down against the top surface of ring 6 thereby closing off the port whenever the hanger is pressurized. However, as hanger pressure increases causing hanger inflation height "e" to increase, hanger wall 3 peels away from the upper surface of ring 6. When the hanger wall peels away far enough to lift port 23 out of contact with ring 6, hanger inflation air will begin to escape to atmosphere through port 23 passing freely between the unattached central portion of sheet 24 and the outer face of hanger wall 3. This automatic loss of hanger inflation air will prevent further increase of pressure inside the hanger and stabilizes inflation height "e" at a level below which dynamic instability would occur. It is desirable for this automatic pressure limiting to occur even if the operator should attempt to further increase hanger pressure by further opening valve 21. This is accomplished by making the cumulative leakage area of all ports 23 greater than the area of orifice 22 which admits inflation air into the hanger.

To insure that hanger inflation air will not leak out through port 23 during initial inflation of the hanger, port 23 can be pressed against the top surface of plate 6 and sealed off by a block of elastomeric sponge material 25 (in FIG. 1) which is mounted to the inside surface of base 1 positioned immediately above port 23. When the hanger is deflated and the air caster is at rest, ring 6 presses port 23 against block 25 thereby sealing the port and preventing air flow therethrough until the hanger is pressurized and begins to inflate.

Operating experience with this type air caster has demonstrated that the ratio of hanger pressure "$P_H$" to cushion pressure "$P_C$" is critical for the avoidance of dynamic instability of the loaded air caster. Typically, air casters of this type will be stable whenever $$P_H < \tfrac{1}{2} P_C.$$

Furthermore, hanger inflation height "e" and hanger pressure "$P_H$" are also related with greater hanger pressure producing greater hanger inflation height. Therefore, with the seal geometry specified, this type air caster will be stable provided $$e < \tfrac{1}{2}(R - r)$$

where "R" is outer hanger radius and "r" is inner hanger radius as shown in FIG. 1. Maximum hanger inflation height "e" is governed by the radial position of port 23 relative to the outer edge of flat ring-shaped plate 6. If port 23 is located radially outboard toward the edge of ring 6 it will begin to pass air at a lower inflation height than if it is located radially inboard. Therefore, it is a feature of this invention to radially position port 23 relative to the outer edge of ring 6 so that the relationships specified above are satisfied.

The cross-referenced issued patent discloses small fixed diameter bleed holes or eyelets in the outer flexible wall of the inflatable seal hanger. These eyelets allow air to bleed from the interior of the hanger to atmosphere during operation to provide dynamic damping of hanger pressure pulsations. As stated in the patent, these bleed eyelets are preferably located in the lower portion of the hanger so they are closed by pressing against the flat rigid ring-shaped plate during initial buildup of hanger inflation pressure and remain closed until the hanger expands to its desired operating height. However, subsequent operating experience has demonstrated that positive means of sealing off these bleed eyelets is desirable during initial pressurization of the hanger. On the other hand, once the hanger begins to inflate, other means must insure that the bleed eyelets cannot close at any operating height of the hanger. These apparently conflicting requirements are satisfied by the design features described below.

FIG. 6 is a perspective view of the inflatable seal hanger showing one small diameter bleed eyelet 26 located in the outer flexible hanger wall. This bleed eyelet is also shown in the plan view of FIG. 7 and the cross-sectional view of FIG. 9. As shown in the figures, ribbed material 27 is mounted to the top surface of the flat rigid ring-shaped plate 6 facing the bleed eyelet. Therefore, when the inflatable hanger is pressurized to press the outer wall of the hanger 3 tightly against the flat ring-shaped plate, air continues to flow through the bleed eyelet finding its way to atmosphere through the radial grooves of the ribbed material. Therefore, addition of this ribbed material makes the damping action of the eyelet effective at all operating heights of the air caster. To close off flow through the bleed eyelet during initial hanger pressurization, an elastomeric sponge block 25 is mounted inside the hanger on the underside surface of base 1. This block is positioned immediately above bleed eyelet 26 to press against the eyelet and seal off flow therethrough when the inflatable hanger is collapsed. Then as soon as the hanger is pressurized and begins to inflate, the elastomeric block is lifted clear of the bleed eyelet allowing air to flow through it at all operating heights of the hanger.

Ideally the operator initially opens gate valve 18 to admit flotation air into the lifting cushion of the air caster and then opens pressure regulator valve 21 to pressurize the seal hanger. If the valves are opened in this sequence, inner flexible wall 4 of the seal hanger balloons upward as shown in FIG. 1. However, since cushion and seal hanger are separately inflated, it is possible to inadvertantly inflate them in reverse order. If the seal hanger is pressurized first with no pressure inside the lifting cushion, it is possible to damage the air caster by causing inner wall 4 of the hanger to balloon downward. This will tend to peel the inner flexible wall 20 of the seal hanger away from its attachment to the cylindrical base structure. It is an object of this invention to make operation foolproof by preventing this. This is accomplished by placing at least one radial port 28 in the outer wall of hollow cylindrical structure 2. This port is positioned between the circumferential attachment of inner seal hanger wall 4 to the wall of cylindrical structure 2 and the bottom edge of the cylindrical structure. This port is shown in profile cross-section in FIG. 1 and is shown in planview cross-section in FIG. 3. When the air caster is operated properly, lifting cushion pressure "$P_C$" is always greater than hanger inflation pressure "$P_H$". Therefore, means must be provided to prevent flow through radial port 28 whenever $P_C > P_H$. However, to prevent reverse operation, it is necessary to allow flow through port 28 whenever $P_C < P_H$. Therefore, the port must function as a check valve to allow flow in the outward radial direction but block flow in the inward direction. This is accomplished by placing a flexible sheet of fluid-tight elastomeric material 29 over the port on the outside of cylindrical structure 2. This sheet has vertical height "B" when installed as shown in FIG. 1. It is attached to the outer face of the cylindrical wall, by bonding for example, only over its outer portions in the regions designated to be of circumferential width "D" in FIG. 3. The central region of sheet 29 which covers over port 28 is therefore left unattached. When flotation air attempts to flow outward through port 28 it can pass freely between sheet 29 and the cylindrical wall to escape into the lifting cushion. On the other hand if cushion pressure "$P_C$" exceeds hanger pressure "$P_H$", sheet 29 is pressed firmly against the outer face of the cylindrical wall by cushion pressure and radially inward flow through port 28 is automatically blocked. In the event the operator attempts to pressurize the seal hanger before pressurizing the lifting cushion, it is imperative that all radial ports 28 be capable of venting seal inflation air at least as rapidly as it can be supplied through hanger inflation port 22. This is assured by making the cumulative effective area of all ports 28 larger than the area of hanger inflation port 22.

An air caster like that described is typically mounted to the flat underside of cooperative load bearing structure. Such structure may be a flat-bottomed platform or pallet for example. The load bearing platform or pallet typically includes integral supply manifolds to bring air or fluid to orifice 19 for introduction into the lifting cushion and to orifice 22 for introduction into the seal hanger. Gate valve 18 and pressure regulator valve 21 may be mounted on the load bearing platform or pallet; or alternatively, they may be installed at a remote location and be connected to the manifolds of the load bearing structure by flexible hose. In any event, orifices 19 and 22 typically match up to similar orifices on the underside of the load bearing platform or pallet with flexible elastomeric gaskets surrounding each orifice sandwiched between the air caster and the load bearing structure to provide a fluid-tight interface for transfer of air or fluid between the two.

Figure 3:
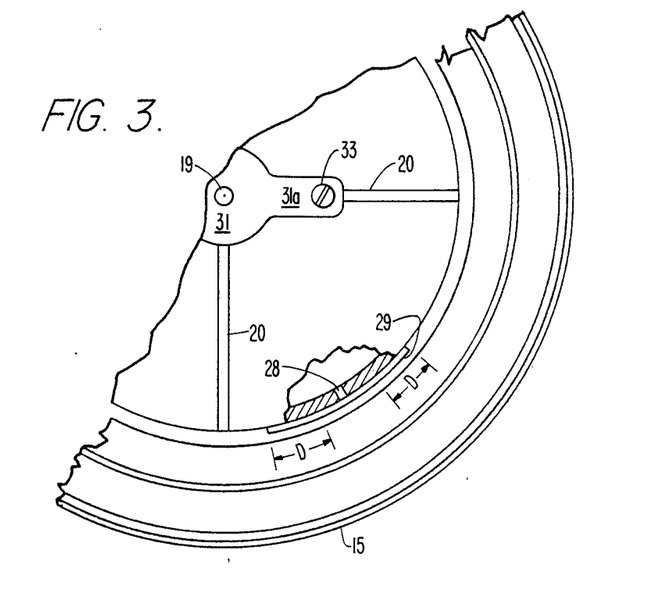
FIG. 3 is a partial underside view of the air caster showing means of attaching the air caster to adjacent structure and also showing a check valve mounted in the outer cylindrical wall of the structural base.

Holes 30 equally spaced around the outer periphery of planar air caster base structure 1 accept attaching bolts or screws for mounting the air caster to cooperative load bearing structure. Operating experience has demonstrated, however, that it is also desirable to have at least one attaching screw located near the center orifice 19. This compresses the gaskets between the parts to prevent leakage past the gaskets which surround the two orifices. To accomodate a central attaching screw, an axial passage 31 is provided which surrounds orifice 19 and passes downward through the center of cylindrical base structure 2. This passage admits flotation air or fluid to the lifting cushion. This axial passage is typically of larger cross-sectional area than orifice 19. Although this axial passage is integral with the lifting cushion as shown in FIG. 1, it is isolated from the interior of cylindrical base structure 2 and the interior of the inflatable seal hanger. The marginal area of axial passage 31 surrounding orifice 19 provides space for one or more attaching screws immediately outboard of orifice 19. However, space limitations, particularly on small size air casters, make it preferable to provide an annex 31a to axial passage 31. This annex is shown in profile cross-section in FIG. 1 and in planview in FIG. 2. As shown, this annex is an integral part of the axial passage and the lifting cushion but it provides an enlarged area for mounting an attaching screw or bolt. Port 32 through base structure of the air caster can accept an attaching bolt or screw 33 as shown in FIG. 3.

I claim:

1. In a fluid cushion device comprising:
   base means to receive loads, and
   at least one sealing assembly to confine a fluid cushion,
   said sealing assembly including an annular hanger projecting from the base means and annular structure below the hanger and cooperative therewith to enclose the fluid cushion,
   said hanger made of flexible sheet material and inflatable for vertical resilient deformability to yieldingly urge said annular structure away from the base means,
   the hanger when inflated having an outer annular flexible sheet wall extending from the base means radially inwardly to the annular structure to act under tension to oppose lateral displacement of the annular structure in one respect relative to the base means, and
   having an inner annular flexible sheet wall extending from the base means radially outwardly to the annular structure to oppose lateral displacement of the annular structure in the opposite respect relative to the base means,
   attachment of said outer annular flexible sheet wall to said base means being at radius "R" and attachment of said inner annular flexible sheet wall to said base means being at radius "r" with the ratio $$\frac{r}{R} \leq 0.6.$$

2. A combination as set forth in claim 1 in which the inner and outer flexible sheet walls of said inflatable hanger comprise truncated cones with height "h" such that $$\frac{h}{(R-r)} \leq 0.6.$$

3. An inflatable seal hanger as described in claim 1 having an outer annular flexible sheet wall and an inner annular flexible sheet wall each comprising at least one truncated cone,
the height of said inner wall cone "h" related to its innermost radius "r" by the ratio $$\frac{h}{r} \leq 0.4$$

and
the height of said outer wall cone "h" related to its outermost radius "R" by the ratio $$\frac{h}{R} \leq 0.2.$$

4. An inflatable hanger as described in claim 3 in which the two conical annular flexible sheet walls are mounted concentrically with their contiguous edges attached to a common ring-shaped sheet which is attached to one surface of a rigid ring-shaped plate.

5. A combination as set forth in claim 4 in which each conical annular flexible sheet wall is made of radial segments of woven fabric in which threads of each segment are oriented parallel to the radial center line of the segment, and
said fabric is coated with flexible fluidtight sealing material.

6. A combination as set forth in claim 4 in which the sheet material of the inner and outer flexible sheet walls comprises truncated cones, the circumferential edge of smallest diameter of the inner cone being the inner circumferential edge of the hanger and circumferential edge of largest diameter of the outer cone being the outer circumferential edge of the hanger.

7. An inflatable hanger as described in claim 3 in which said outer annular flexible sheet wall consists of multiple truncated cones nested together to give the outer wall greater strength than the inner wall.

8. A multi-layer hanger wall as described in claim 7 wherein said nested truncated cones are staggered in azimuth relative to each other equally spacing their overlapped joints around the periphery of the hanger.

9. An inflatable hanger as described in claim 6 in which the inner circumferential edge of the hanger is attached to the wall of the cylindrical base at a level spaced below the planar portion of the base to increase the effective volume enclosed by the hanger envelope.

10. An inflatable hanger as described in claim 6 in which the outer circumferential edge of the hanger is attached to an annular structural ridge on the underside of the planar portion of the structural base,
said hanger encompassed by an annular guard means fixedly mounted to the underside of the planar portion of the base to protect the inflatable hanger,
said guard means comprising a cylindrical structural ring with vertical height less than height of the cylindrical base structure,
said annular guard attached by a number of equally spaced flush-head screws projecting through the planar portion of the base into an annular space between said hanger and said guard ring,
said annular space also filled with rigid-setting plastic material to unite the hanger, the base and the guard ring into one integral structural assembly.

11. In a fluid cushion device comprising:
base means to receive loads, and
at least one sealing assembly to confine a fluid cushion,
said sealing assembly including an annular inflatable hanger projecting from the base means and annular structure below the hanger and cooperative therewith to enclose the fluid cushion,
said annular structure including resiliently deformable annular sealing means projecting downward to close proximity to the ground surface under the device,
said annular sealing means centered concentrically on said inflatable hanger.

12. Resiliently deformable annular sealing means as described in claim 11 having radial width "d" substantially less than radial width (R-r) of the inflatable hanger and related thereto by the ratio $$0.25 < \frac{d}{(R-r)} < 0.35.$$

13. A combination as set forth in claim 11
in which said annular sealing means comprises a stack of substantially ring-shaped resiliently deformable members; and
in which at least one flexible ring-shaped sheet is interposed between two of said members to act under hoop tension to oppose radially outward expansion of the annular sealing means due to fluid pressure inside the lifting cushion.

14. A combination as set forth in claim 13 in which a resiliently flexible wear strip is removably attached to the underside of the lowest member of the stack.

15. A combination as set forth in claim 14 in which a flexible abrasion-resistant wear strip is mounted on the underside of the stack; and
in which a ring-shaped reinforcement sheet is interposed between the lowermost ring-shaped member of the stack and said wear strip.

16. A combination as set forth in claim 13 in which the ring-shaped members of the stack include relatively thick members made of resiliently deformable cellular elastomer,
radial dimensions of said deformable members and said ring-shaped members being essentially identical,
vertical height "c" of each ring-shaped resiliently deformable member and radial width "d" of each said member having the ratio $$0.40 < \frac{c}{d} < 0.50.$$

17. A combination as set forth in claim 16 which includes at least one ring-shaped sheet in hoop tension between two of the relatively thick members of the stack.

18. A combination as set forth in claim 11 which includes a wear strip of resilient abrasion-resistant material mounted to the underside of the annular sealing means,
 said wear strip being set back radially from the outer edge of the annular sealing means around its circumference to minimize noise created by escaping air under the wear strip.

19. A combination as set forth in claim 18 in which the wear strip is made at least largely of elastomeric material.

20. A combination as set forth in claim 19 in which the underside of the wear strip is coated with a low friction wear-resistant plastic.

21. A combination as set forth in claim 18 in which said wear strip is constructed of felt-like fabric.

22. A combination as set forth in claim 18 in which the wear strip is releasably mounted by pressure-sensitive adhesive means.

23. A combination as set forth in claim 18 in which the wear strip is chamfered along its outer circumferential edge.

24. A combination as set forth in claim 18 in which the wear strip is chamfered along its inner circumferential edge.

25. A combination as set forth in claim 11 in which an upper annular portion of said sealing means is resiliently deformable and is substantially softer than the lower annular portion of the sealing means to cause the sealing means to accomodate itself to a local rise in the underlying ground surface primarily by compression of said annular portion,
 the relatively thick part of said upper annular portion consisting of MIL-C-3133 SCO11 soft open cell natural rubber sponge,
 the relatively thick part of said lower annular portion consisting of MIL-R-6130 type II soft closed cell neoprene sponge,
 density of the upper annular part "$p_1$" and density of the lower annular part "$p_2$" having the ratio $$\frac{p_1}{p_2} \approx \frac{2}{3}.$$

26. A combination as set forth in claim 25 wherein said upper annular portion of said sealing means having overall height "c" consists of multiple relatively thick ring-shaped members with flexible ring-shaped sheets interposed between them,
 said lower annular portion of said sealing means having overall height "c" consists of multiple relatively thick ring-shaped members with flexible ring-shaped sheets interposed between them,
 overall vertical height "c" of each said annular portion and radial width "d" of each said member having the ratio $$0.4 < \frac{c}{d} < 0.5.$$

27. A combination as set forth in claim 25 in which said annular sealing means comprises a stack of relatively thick, substantially ring-shaped resilient deformable members alternating with ring-shaped sheets acting under hoop tension to oppose radially outward expansion of the annular sealing means, one of said sheet members being the uppermost member of the stack.

28. A combination as set forth in claim 26 in which a flexible abrasion-resistant wear strip is mounted on the underside of the stack; and
 in which a ring-shaped reinforcement sheet is interposed between the lowermost ring-shaped member of the stack and said wear strip.

29. In a fluid cushion device comprising:
 base means to receive loads, and
 at least one sealing assembly to confine a fluid cushion,
 said sealing assembly including an annular inflatable hanger projecting from the base means and annular structure below the hanger and cooperative therewith to enclose the fluid cushion,
 said annular structure including a rigid ring-shaped plate attached to the underside of the hanger,
 said annular structure further including resiliently deformable annular sealing means projecting downward from the ring-shaped plate to close proximity to the ground surface under the device,
 said resiliently deformable annular sealing means flexibly mounted to the underside of the ring-shaped plate by a ring-shaped flexible, fluid-tight sheet which is attached in fluid-tight manner around its outer circumferential margin to the annular sealing means and is attached in fluid-tight manner around its inner circumferential margin to the rigid plate.
 the intermediate circumferential portion of the ring-shaped sheet being slack to permit the annular sealing means to tilt locally relative to the rigid ring-shaped plate.

30. In a fluid cushion device comprising:
 base means to receive loads, and
 at least one sealing assembly to confine a fluid cushion,
 said sealing assembly including an annular hanger projecting from the base means and annular structure below the hanger and cooperative therewith to enclose the fluid cushion,
 said hanger being made of flexible sheet material and being inflatable for vertical resilient deformability to yieldingly urge said annular structure away from the base means,
 said annular structure being of less radial dimension than the hanger and being positioned within an annular area defined by the hanger,
 the hanger when inflated having an outer annular flexible sheet wall extending from the base means radially inwardly to the annular structure,
 said annular structure including a rigid-ring-shaped plate attached at its central circumferential region to the underside of the hanger,
 automatically throttling valve means to bleed fluid from the seal hanger to atmosphere comprising at least one port in the outer flexible wall of the hanger positioned radially inboard of the outer edge of said rigid ring-shaped plate so it lies against the plate to be closed off by the plate when the hanger is partially inflated and to open when the hanger wall peels away from the plate as the hanger becomes fully inflated.

31. Throttling valve means as described in claim 30 wherein said port is covered over by a sheet of flexible fluid-tight elastomeric material attached to the outer surface of the flexible hanger wall on opposite sides of said port.

32. At least one port in the outer wall of the hanger as described in claim 30, the effective leakage area of all such ports being greater than the area of the port which admits fluid into the hanger envelope.

33. A block of resiliently deformable elastomeric sponge positioned opposite each port described in claim 30 and mounted to the structural base inside the hanger envelope to press said port against the rigid ring-shaped plate of the annular seal assembly whenever the hanger envelope is deflated thereby blocking fluid flow therethrough during initial hanger inflation.

34. At least one port in the outer flexible wall of the seal hanger as described in claim 30, each said port positioned radially inboard of the outer edge of said rigid ring-shaped plate to pass fluid through the port as the hanger peels away from the plate during inflation whenever the ratio $$\frac{P_H}{P_C} > \frac{2}{3}$$

where "$P_H$" is fluid pressure inside the hanger envelope and "$P_C$" is pressure inside the lifting cushion.

35. At least one port in the outer flexible wall of the seal hanger as described in claim 30, each said port positioned radially inboard of the outer edge of said rigid ring-shaped plate to pass fluid through the port as the hanger peels away from the plate during inflation whenever the ratio $$\frac{e}{R-r} > \frac{1}{3}$$

where "e" is vertical separation between the rigid ring-shaped plate and the structural base during operation and (R-r) is radial width of the hanger envelope.

36. In a fluid cushion device comprising:
base means to receive loads, and
at least one sealing assembly to confine a fluid cushion,
said sealing assembly including an annular inflatable hanger projecting from the base means and annular seal structure below the hanger and cooperative therewith to enclose the fluid cushion,
said annular seal structure being of less radial dimension than the hanger and being positioned within an annular area defined by the hanger,
said annular structure including a rigid ring-shaped plate attached at its central circumferential region to the underside of the hanger,
at least one damping eyelet in the flexible outer wall of said hanger positioned radially inboard of the outer edge of said rigid ring-shaped plate,
ribbed material mounted onto the rigid ring-shaped plate facing said eyelet with its ribs parallel to the radial direction,
a block of resiliently deformable elastomeric sponge mounted onto the structural base inside the hanger envelope facing said eyelet,
said ribbed material allowing fluid to flow through the eyelet at all inflation heights of the seal hanger except when the eyelet is pressed against said sponge block.

37. A combination as set forth in claim 36 in which the means to inflate the seal hanger comprises an adjustable pressure regulating valve operable to maintain a selected pressure inside the hanger envelope.

38. An adjustable pressure regulating valve as described in claim 37 which is a "relieving" type valve to allow back flow through the valve if hanger pressure exceeds pre-set valve outlet pressure.

39. In a fluid cushion device comprising:
base means to receive loads, and
at least one sealing assembly to confine a fluid cushion,
said sealing assembly including an annular inflatable hanger projecting from the base means and annular seal structure below the hanger and cooperative therewith to enclose the fluid cushion,
said base means including a hollow cylindrical chamber,
said hanger encompassing the chamber and being in fluid communication with the chamber for fluid flow between the chamber and the hanger,
at least one port in the outer wall of said cylindrical chamber positioned between the attachment of the inner hanger envelope to said wall and the lower edge of said wall,
said port covered over by a sheet of flexible fluid-tight elastomeric material attached to the outer surface of the cylindrical wall on opposite sides of said port,
said combination allowing fluid to pass through the port whenever chamber pressure exceeds pressure in the surrounding fluid cushion but blocking fluid flow therethrough whenever cushion pressure exceeds chamber pressure.

40. At least one port in the outer wall of a hollow cylindrical chamber as described in claim 39, the effective leakage area of all such ports being greater than the area of the port which admits fluid into the chamber.

41. In a fluid cushion device comprising:
base means to receive loads, and
at least one sealing assembly to confine a fluid cushion,
said sealing assembly including an annular inflatable hanger projecting from the base means and annular seal structure below the hanger and cooperative therewith to enclose the fluid cushion,
said base means including an axial passage through the base means to supply pressurized fluid to the lifting cushion,
said passage being of larger cross-sectional area than the port which admits pressurized fluid into said passage.

42. A fluid passage as described in claim 41 which includes an annex in said passage providing space adjacent to said port to accomodate attaching means for securing the base to cooperative load bearing structure.

* * * * *